US007957853B2

(12) United States Patent
Stock et al.

(10) Patent No.: US 7,957,853 B2
(45) Date of Patent: Jun. 7, 2011

(54) FLIGHT RESTRICTION ZONE DETECTION AND AVOIDANCE

(75) Inventors: Todd Michael Stock, Germantown, MD (US); James Daniel Nickum, Bristow, VA (US); Doyle Travis Peed, Roxboro, NC (US); Frank J. Ruscil, Jr., West Long Branch, NJ (US); Jonathan L. Schwartz, Oak Hill, VA (US)

(73) Assignee: The MITRE Corporation, McLean, VA (US)

( * ) Notice: Subject to any disclaimer, the term of this patent is extended or adjusted under 35 U.S.C. 154(b) by 977 days.

(21) Appl. No.: 11/451,415

(22) Filed: Jun. 13, 2006

(65) Prior Publication Data

US 2009/0322567 A1 Dec. 31, 2009

(51) Int. Cl.
*G08B 23/00* (2006.01)
*G08B 31/00* (2006.01)
*G01C 21/00* (2006.01)

(52) U.S. Cl. ............ 701/9; 701/213; 701/300; 340/964; 340/979

(58) Field of Classification Search .................. 701/1, 3, 701/8, 9, 14, 200, 206–208, 211, 213, 300–302; 244/75.1, 76 R; 340/901, 905, 907, 945, 340/961, 963, 971, 973, 979, 983, 995.12, 340/995.24, 995.25, 995.27, 988
See application file for complete search history.

(56) References Cited

U.S. PATENT DOCUMENTS 5,028,929 A 7/1991 Sand et al.
5,202,692 A 4/1993 Huguenin et al.
5,255,003 A 10/1993 Mitchell et al.
5,307,060 A 4/1994 Prevulsky et al.
5,468,964 A 11/1995 Gopalsami et al.
5,636,123 A * 6/1997 Rich et al. ..................... 701/207
5,936,522 A 8/1999 Vogt
5,995,903 A 11/1999 Smith et al.
6,125,327 A 9/2000 Kalenian
6,133,867 A * 10/2000 Eberwine et al. ............... 342/29
6,184,816 B1 2/2001 Zheng et al.
6,199,008 B1 3/2001 Aratow et al.

(Continued)

OTHER PUBLICATIONS

Huang, G.T., "Casting the Wireless Sensor Net," *Technology Review*, pp. 50-56, Jul./Aug. 2003.

(Continued)

*Primary Examiner* — Mark Hellner
*Assistant Examiner* — Ari M Diacou
(74) *Attorney, Agent, or Firm* — Sterne, Kessler, Goldstein & Fox PLLC

(57) ABSTRACT

A method, system and computer program product to detect and indicating TFR zone violations, potential TFR zone violations or TFR zones in vicinity of an aircraft and indicating measures to avoid or exit a TFR zone are provided. TFR zone information and an aircraft's position information are received. The aircraft's position information is processed to determine the aircraft's current heading. A TFR zone violation is determined based on the aircraft's current position. A potential TFR violation is determined based on whether the aircraft's current heading intersects a TFR zone. The presence of a TFR zone in the vicinity of the aircraft is determined based on the aircraft's current position and heading. Indicators of a TFR violation, potential TFR violation, no TFR violation or TFR zones in the vicinity are provided. If a TFR violation, or possible TFR violation or TFR zone in the vicinity are found, measures are indicated to exit the TFR zone or change the aircraft's current heading to avoid the TFR zone.

34 Claims, 10 Drawing Sheets

U.S. PATENT DOCUMENTS

| | | | | |
|---|---|---|---|---|
| 6,208,247 | B1 | 3/2001 | Agre et al. | |
| 6,292,747 | B1 | 9/2001 | Amro et al. | |
| 6,381,538 | B1 | 4/2002 | Robinson et al. | |
| 6,430,418 | B1 | 8/2002 | Nivens et al. | |
| 6,466,569 | B1 | 10/2002 | Wright et al. | |
| 6,489,915 | B1 | 12/2002 | Lines et al. | |
| 6,501,392 | B2 | 12/2002 | Gremmert et al. | |
| 6,516,272 | B2 | 2/2003 | Lin | |
| 6,522,292 | B1 | 2/2003 | Ellenby et al. | |
| 6,563,542 | B1 | 5/2003 | Hatakenaka et al. | |
| 6,581,008 | B2 | 6/2003 | Intriligator et al. | |
| 6,587,687 | B1 | 7/2003 | Wiedeman | |
| 6,606,563 | B2 | 8/2003 | Corcoran, III | |
| 6,675,095 | B1 * | 1/2004 | Bird et al. | 701/301 |
| 6,683,541 | B2 * | 1/2004 | Staggs et al. | 340/961 |
| 6,708,091 | B2 * | 3/2004 | Tsao | 701/9 |
| 6,748,325 | B1 * | 6/2004 | Fujisaki | 701/301 |
| 7,053,797 | B2 * | 5/2006 | Taylor | 340/961 |
| 7,173,545 | B2 * | 2/2007 | Berthe | 340/961 |
| 7,225,063 | B2 * | 5/2007 | Tart et al. | 701/4 |
| 7,598,888 | B2 * | 10/2009 | Matuska et al. | 340/945 |
| 2002/0039070 | A1 * | 4/2002 | Ververs et al. | 340/901 |
| 2002/0044533 | A1 | 4/2002 | Bahl et al. | |
| 2002/0053983 | A1 * | 5/2002 | Chamas et al. | 340/945 |
| 2002/0075179 | A1 | 6/2002 | Hudson et al. | |
| 2002/0138200 | A1 | 9/2002 | Gutierrez | |
| 2002/0167442 | A1 | 11/2002 | Taylor | |
| 2002/0191536 | A1 | 12/2002 | LaForge et al. | |
| 2003/0009278 | A1 | 1/2003 | Mallet et al. | |
| 2003/0055564 | A1 * | 3/2003 | Tart et al. | 701/301 |
| 2003/0083804 | A1 | 5/2003 | Pilley et al. | |
| 2003/0093187 | A1 * | 5/2003 | Walker | 701/1 |
| 2003/0109973 | A1 | 6/2003 | Hensey et al. | |
| 2003/0151513 | A1 | 8/2003 | Herrmann et al. | |
| 2003/0169185 | A1 * | 9/2003 | Taylor | 340/945 |
| 2003/0206119 | A1 | 11/2003 | Riley | |
| 2003/0222795 | A1 | 12/2003 | Holforty et al. | |
| 2004/0160341 | A1 * | 8/2004 | Feyereisen et al. | 340/970 |
| 2004/0267412 | A1 * | 12/2004 | Arnouse | 701/2 |
| 2005/0200501 | A1 * | 9/2005 | Smith | 340/963 |

OTHER PUBLICATIONS

Roddy, D., *Satellite Communications*, McGraw-Hill, ISBN 0071371761, entire book submitted, Copyright 2001.

Stock, T., *Developing a Low Cost Airspace Alerting & Avoidance System for General Aviation*, A Presentation to the $23_{rd}$ Digital Avionics Systems Conference, Salt Lake City, Utah, 14 pages, Copyright 2004.

* cited by examiner

FLIGHT RESTRICTION ZONE DETECTION AND AVOIDANCE

FIELD OF THE INVENTION

The present invention relates generally to flight restriction zones and more specifically to detecting and avoiding flight restriction zones.

BACKGROUND ART

Aircrafts and pilots (with possible exception of certain military and/or government aircrafts) are expected to keep away from most no-fly zones, restricted airspace, flight restriction zones, special use airspace (SUA), military operating areas, and/or the like (herein referred to as “Temporary Flight Restriction” (TFR) zones). Although certain restricted zones are well known by pilots, others can arise quickly and/or dynamically, sometimes without adequate warning to pilots. For example, pilots are expected to not fly their aircraft over, or within a certain distance of the motorcade of the President of the United States. As air traffic grows, the potential burden on human air traffic controllers and aircraft pilots grows likewise, and can become overwhelming, to the point that not all aircraft and/or their pilots will necessarily be aware of restricted zones and would not be able to avoid TFR zones at all times resulting in a TFR zone violation. A TFR violation occurs when an aircraft is in a designated TFR zone. A possible or potential TFR zone violation occurs when an aircraft’s current heading intersects a TFR zone.

What is needed is a method and system for detecting and avoiding restricted airspace zones.

BRIEF SUMMARY OF THE INVENTION

The invention comprises a method to indicate a current or potential TFR zone violation and indicate measures to avoid or exit a TFR zone. The method comprises receiving TFR zone information and aircraft position information. The method includes processing aircraft position information to determine aircraft’s current heading and determining whether an aircraft’s current heading is intersecting a TFR zone based on the received TFR zone information. The method further comprises determining whether the aircraft is in a TFR zone and whether a TFR zone is in the vicinity of an aircraft. The method also includes providing an indication of the presence of one or more TFR zones in the vicinity or the presence of the aircraft inside a TFR zone or possible intersection of the aircraft with a TFR zone based on one or more of the aircraft’s current position, current heading and TFR zone information. The method includes indicating measures to exit a TFR zone if the aircraft is currently in a TFR zone, indicating measures to avoid a TFR zone if the aircraft’s current heading intersects a TFR zone, and indicating the presence and location of a TFR zone if the TFR zone is in the vicinity of the aircraft. An aircraft is determined to be in the vicinity of a TFR zone based at least in part on one or more of a predetermined distance from the aircraft’s current heading to a TFR zone, a predetermined distance between an aircraft’s altitude and a TFR zone ceiling and if a predetermined deviation in the angle of the aircraft’s current heading intersects a TFR zone. The TFR zone information is typically a function of one or more of: TFR start date, TFR start time, latitude, longitude, radius and altitude of a TFR zone. The aircraft position information is typically a function of one or more of: latitude, longitude, altitude, ground speed, course, magnetic variation and date of fix.

The invention also comprises a system to detect and indicate TFR zone violations, potential TFR zone violations or TFR zones in vicinity of an aircraft and indicate measures to avoid or exit a TFR zone. The system comprises a user interface configured to provide indicators; and a computing device. The computing device is configured to receive downloaded or stored TFR information and receive aircraft position information. The computing device determines an aircraft’s current heading and determines whether the aircraft violates a TFR zone based on the aircraft’s position information and TFR information. The computing device also determines whether an aircraft will intersect a TFR zone based on the aircraft’s current heading and TFR information. The computing device uses the user interface to indicate TFR zone violation or possible TFR zone violation, to indicate TFR zones in aircraft’s vicinity and indicate measures to exit a TFR zone or avoid a TFR violation zone.

The invention further comprises a computer program product including a computer useable medium with control logic stored therein for detecting and indicating TFR zone violations, potential TFR zone violations or TFR zones in vicinity of an aircraft and indicating measures to avoid or exit a TFR zone. The computer program product includes control logic means for receiving TFR zone information and an aircraft’s position information and processing the aircraft’s position information to determine the aircraft’s current heading. The computer program produce includes further control logic means for determining whether there is a TFR zone violation based on the aircraft’s current position or whether the aircraft’s current heading results in a potential TFR violation and whether a TFR zone is in the vicinity of the aircraft based on the aircraft’s current position and heading. The computer program product further includes control logic means for providing indicators of a TFR violation, potential TFR violation, no TFR violations or TFR zones in the vicinity. If a TFR violation, or possible TFR violation or TFR zone in the vicinity are found, the computer control logic includes means for indicating measures to exit a TFR zone or change the aircraft’s current heading to avoid a TFR zone.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
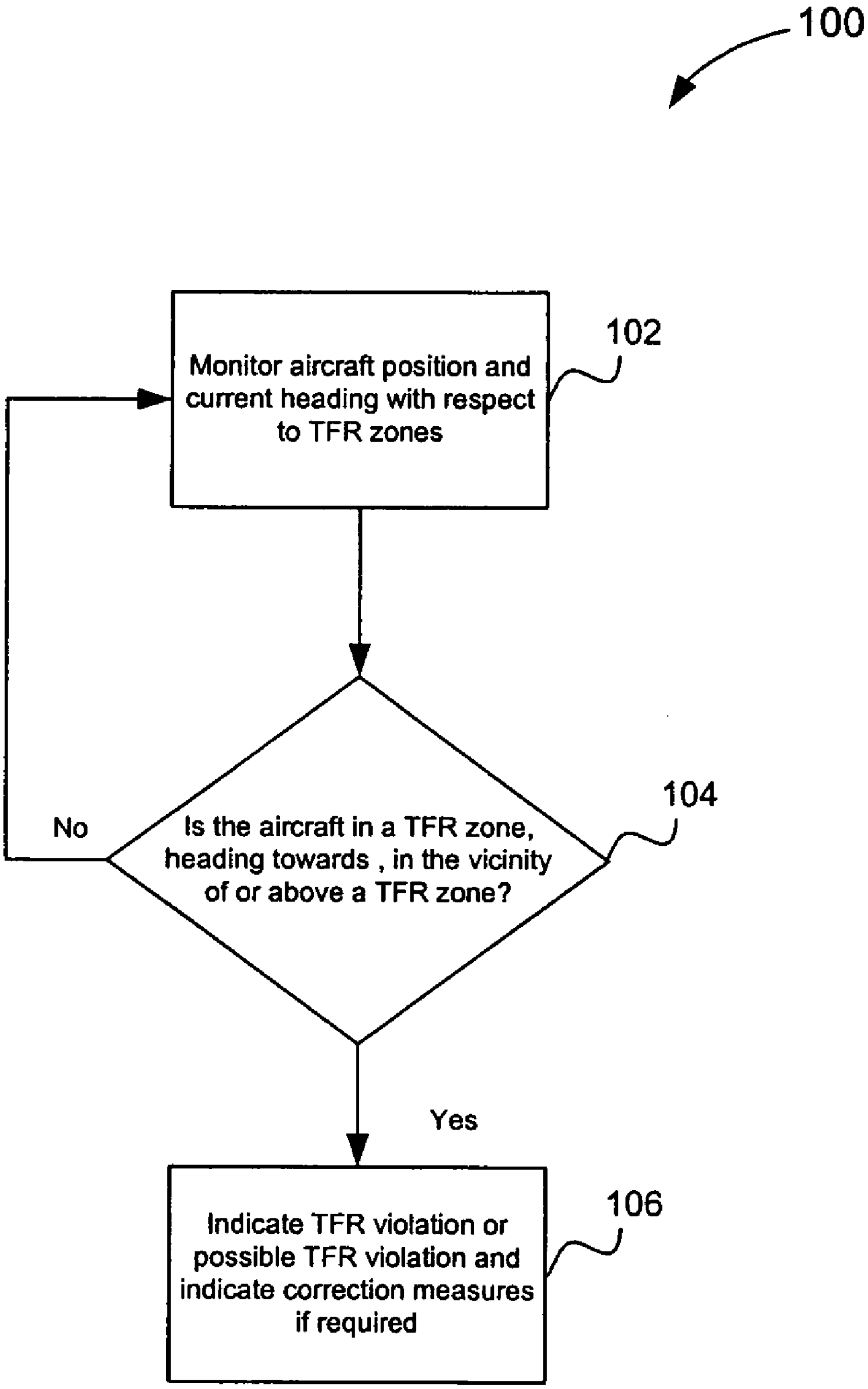
FIG. 1 illustrates an exemplary flowchart to detect, indicate, avoid and/or exit a flight restriction zone according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

This specification discloses one or more embodiments that incorporate the features of this invention. The embodiment(s) described, and references in the specification to "an example", "one embodiment", "an embodiment", "an example embodiment", etc., indicate that the embodiment(s) or example(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 illustrates an exemplary flowchart 100 showing steps to indicate, detect, avoid and/or exit a flight restriction zone according to an embodiment of the invention. These steps may be implemented in hardware, software, firmware or any combination thereof.

In step 102, an aircraft's current position and current heading are determined along with temporary flight restriction (TFR) zone information. The aircraft's current heading with respect to the TFR zone is determined.

In step 104, it is determined whether the aircraft is in a TFR zone, heading towards a TFR zone or in the vicinity of a TFR zone. If the aircraft is not in a TFR zone, heading towards a TFR zone or in the vicinity of a TFR zone, an indication is provided of the same and control returns to step 102.

In step 106, if an aircraft is determined to be in a TFR zone, heading towards a TFR zone or in the vicinity of a TFR zone in step 104, indication of the presence of the aircraft in the TFR zone or presence of a TFR zone in the vicinity of the aircraft, or intersection with a TFR zone based on the aircraft's current heading along with appropriate measures to exit the TFR zone or avoid the TFR zone are provided. In an embodiment, the indications include one or more of audio and visual means.

Figure 2A:
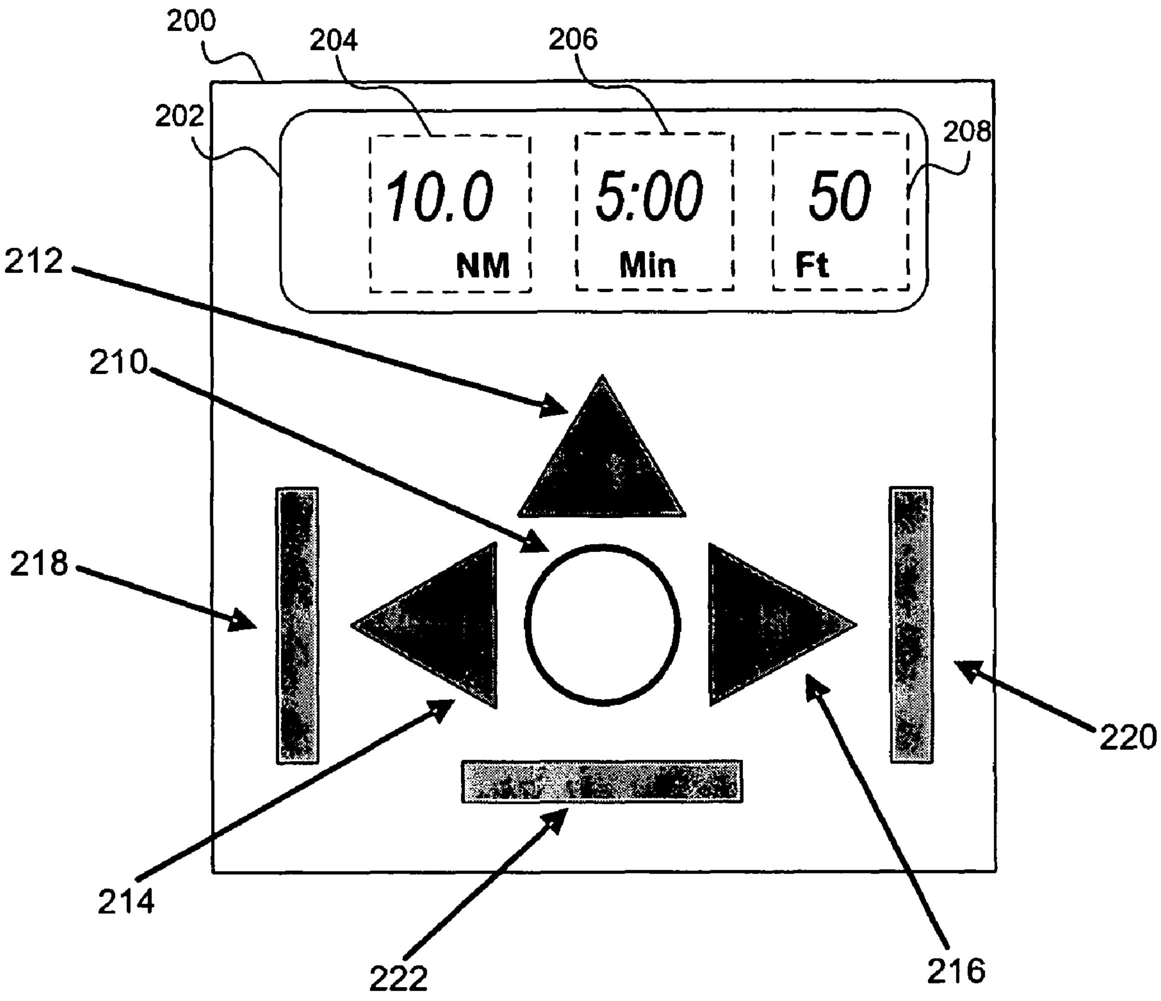
FIG. 2A illustrates an example graphical user interface (GUI) according to an embodiment of the invention.

FIG. 2A illustrates an example graphical user interface (GUI) 200 according to an embodiment of the invention. GUI 200 provides visual indications of presence of a TFR zone in the vicinity of an aircraft, presence of a TFR zone in the current heading of an aircraft, if the aircraft is currently in a TFR zone, and directions to exit a TFR zone or directions to avoid a TFR zone.

In an embodiment, status light 210 indicates the overall status of an aircraft with respect to its location and location of TFR zones. For example, status light 210 is green in color to indicate that the aircraft is not in a TFR zone and there is no intersection between an aircraft's current heading and TFR zones. Status light 210 is yellow to indicate that there is a potential intersection with a TFR zone based on the aircraft's current heading. Status light 210 is red to indicate that the aircraft is currently in a TFR zone based on the aircraft's current position.

Text display 202 indicates distance 204 in Nautical Miles (NM) and time 206 in minutes to fly from an aircraft's current location to the boundary of a TFR zone provided present ground track and speed are maintained. Text display 202 also displays the gain in aircraft altitude 208 in feet, required to clear a TFR zone's ceiling. In an embodiment, text display 202 provides distance 204, time 206 and altitude change 208 when a conflict with a TFR zone exists or whenever desired by an aircraft operator. In an embodiment, the text display 202 is automatically activated when status light 210 is indicating a potential or actual intersection with a TFR zone. When inside of a TFR zone, the distance 204 and time 206 to fly to the boundary are suppressed to indicate to the user that separation with the TFR zone has been lost. Altitude 208 may be displayed to indicate the gain in altitude required to exit the TFR zone.

Climb arrow 212 is activated when an increase in aircraft altitude allows flight over a TFR zone. In an example, climb arrow 212 is displayed in blue. In an embodiment climb arrow 212 is displayed in colors different than colors used for status light 210. Climb arrow 212 remains illuminated until the aircraft ground track is clear of potential conflict with a TFR zone, or the aircraft altitude exceeds that of the ceiling of the TFR zone.

Left turn arrow 214 and right turn arrow 216 indicate the most efficient direction of turn for the aircraft to avoid the TFR zone. The duration for which the left turn arrow 214 or right turn arrow 216 is illuminated is based on the least change in an aircraft's current heading required to avoid the TFR zone. In an example left turn arrow 214 and right turn arrow 216 are displayed in blue. In an embodiment left turn arrow 214 and right turn arrow 216 are displayed in colors different than colors used for status light 210. Left turn arrow 214 and right turn arrow 216 remain illuminated until an aircraft's current heading is clear of potential conflict with a TFR zone or the aircraft's current altitude exceeds that of the ceiling of the TFR zone.

Left watch bar 218, right watch bar 220 and descent watch bar 222 are illuminated to indicate a presence of a TFR zone in the respective direction. In an example, left watch bar 218 and right watch bar 220 are displayed in yellow to indicate when a turn in the displayed direction will result in an intersection with a TFR zone. Descent watch bar 222 is displayed in yellow to indicate that a descent will result in an intersection with a TFR zone. Left watch bar 218, right watch bar 220 and descent watch bar 222 may be illuminated in red to indicate immediate presence of a TFR zone to the left, right or below the aircraft respectively. Once inside an TFR zone, the left and right watch bars 218 and 220 simultaneously illuminate when the preferred exit heading is obtained, indicating that either a left turn or a right turn will extend the duration of flight time within the TFR zone i.e. it may lengthen the duration of the airspace violation.

Other elements which may be included in display 200 are identification of TFR zones, Global Positioning Satellite (GPS) receiver (as in positioning and time source 402) status, system status (e.g., awaiting GPS data), and TFR database (as in database 404) update status.

Figure 2B:
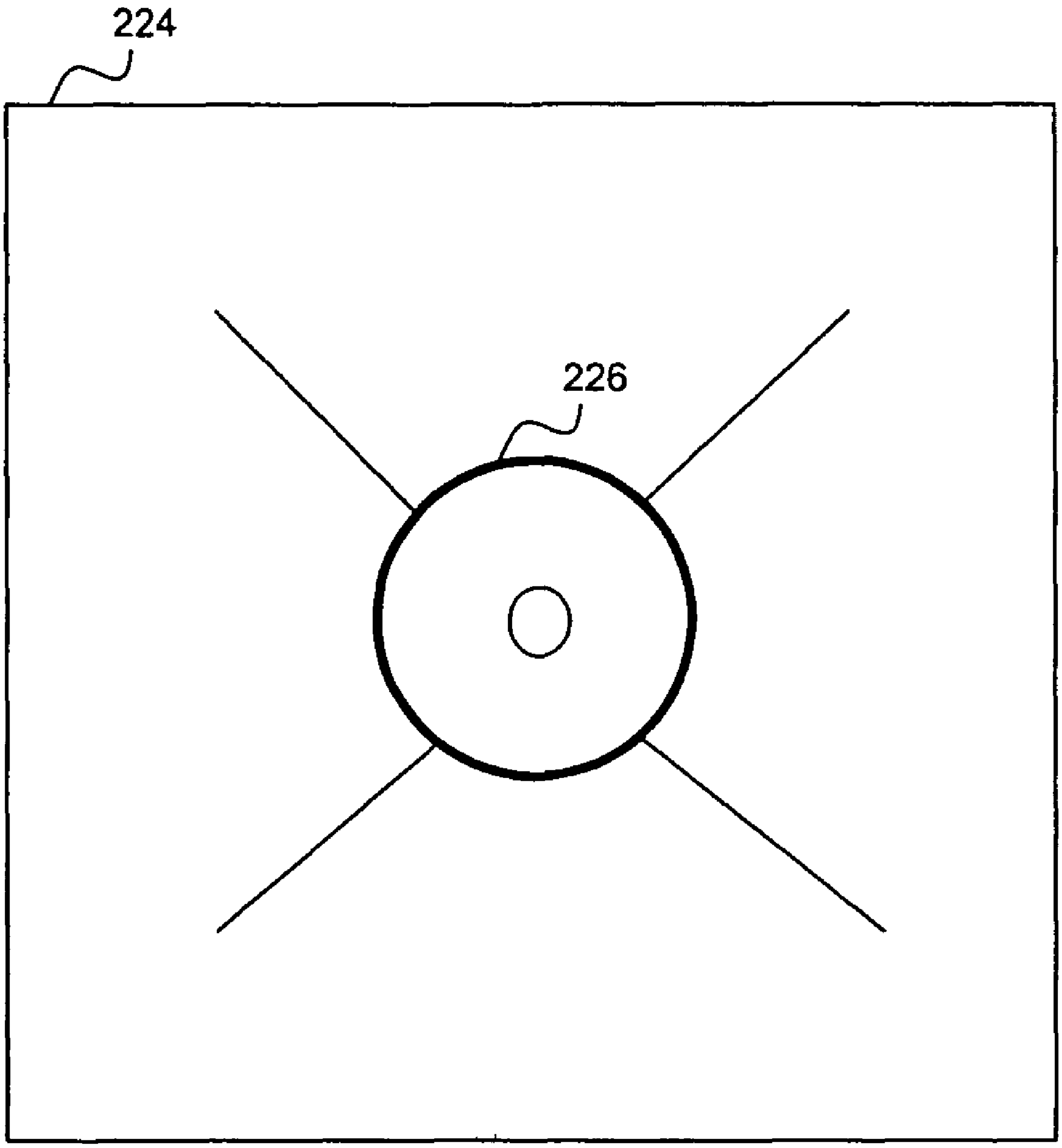
FIG. 2B illustrates an aural indication system according to an embodiment of the invention.

FIG. 2B illustrates an aural indication system 224 that includes speakers 226 according to an embodiment of the invention. Speakers 226 introduce audio annunciating capabilities to provide aural cues to an aircraft operator. In an embodiment, initial warning of a conflict or potential intersection with a TFR zone is annunciated when the conflict is first detected (e.g., "TFR ahead, TFR ahead, TFR ahead"). When an aircraft is approaching a TFR zone boundary a warning is annunciated when the aircraft reaches a predetermined distance from the TFR zone or will intersect the TFR zone in a predetermined amount of time (e.g., "Approaching TFR, Approaching TFR, Approaching TFR"). A violation alert is annunciated when the aircraft loses separation with the TFR zone (e.g., "TFR violation, TFR violation, TFR violation"). A descent advisory is annunciated when descent will create a conflict with a TFR zone (e.g., "TFR below, TFR below, TFR below").

Figure 3:
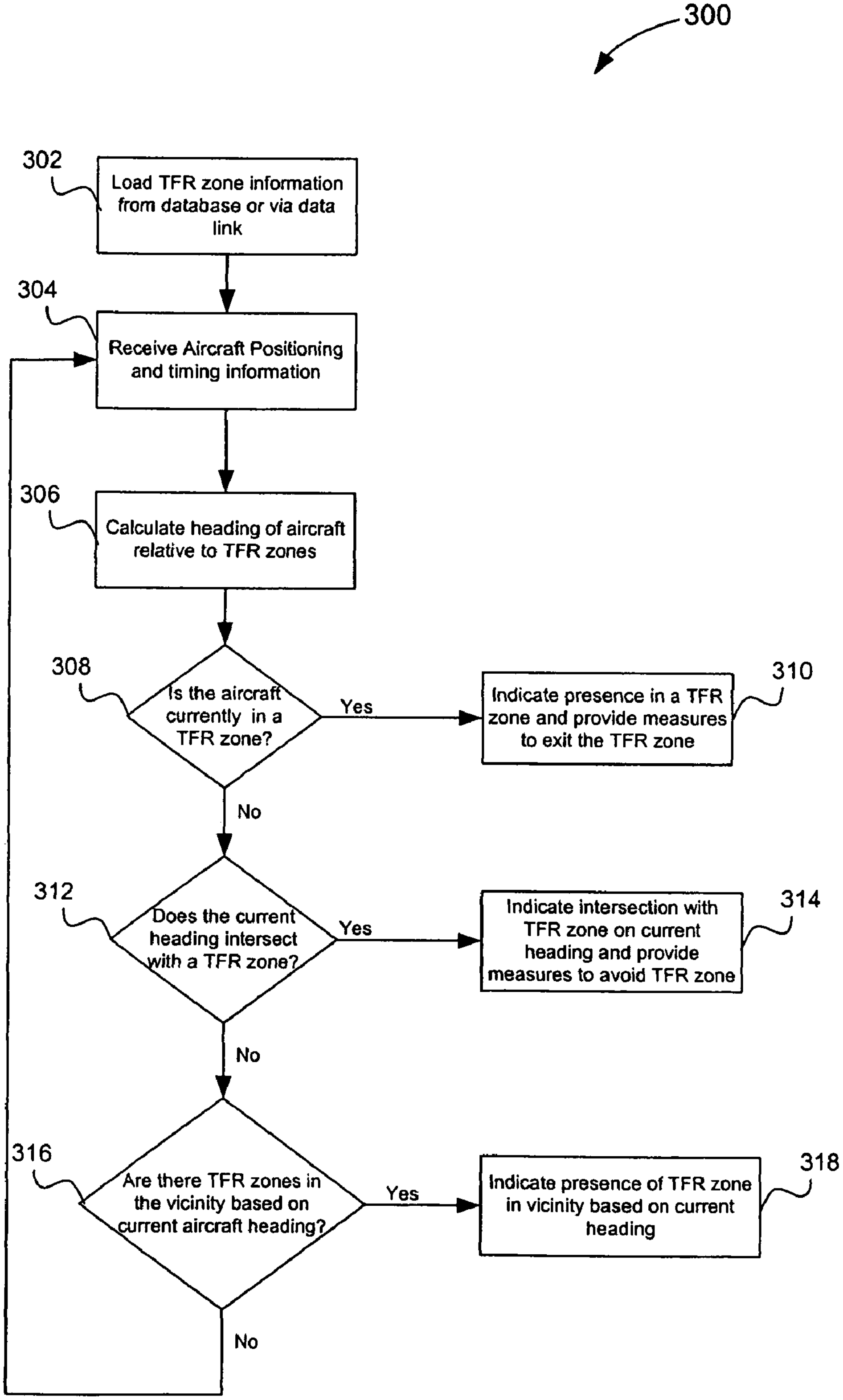
FIG. 3 illustrates another exemplary flowchart to indicate, detect, avoid and/or exit a flight restriction zone.

FIG. 3 illustrates another exemplary flowchart 300 with steps to indicate, detect, avoid and/or exit a flight restriction zone. These steps may be implemented in hardware, software firmware or any combination thereof.

In step 302, TFR zone information is loaded from a database (as in database 404) or downloaded via a datalink (as in datalink 406).

In step 304, aircraft positioning data and a reference system time are obtained from a positioning and time source (as in positioning and time source 402). The aircraft positioning data is used to determine the aircraft's current position and compare the aircraft's current position to TFR zone information obtained in step 302. The time reference is used to determine when the TFR zones determined in step 302 will become effective (e.g., if there is a TFR zone active with a starting time scheduled during the flight).

In step 306, the aircraft's current heading is determined relative to the TFR zone information obtained in step 302. The aircraft's current heading may be obtained based on the aircraft's current position obtained in step 304 and the aircraft's current ground track and ground speed (ground track and ground speed are inherently available from an aircraft's navigation system).

In step 308, it is determined whether the aircraft is currently in a TFR zone based on the aircraft's current position obtained in step 304.

In step 310, if it is determined in step 308 that the aircraft is currently in a TFR zone, visual and/or audio indication of the aircraft's violation of the TFR zone is provided. Visual indication may be provided using GUI 200 and audio indication may be provided using aural indication system 224 as described above. For example, status light 210 may be illuminated in red along with aural warnings. All other warnings may be turned off. The fastest measures (e.g. direction to turn) to exit the TFR zone may also by provided by visual and/or audio means.

In step 312, if it is determined in step 308 that the aircraft is currently not in a TFR zone, it is determined whether the aircraft's current heading, determined in step 306, intersects any TFR zones based on the TFR zone information from step 302.

In step 314, if it is determined in step 312 that the aircraft's current heading intersects a TFR zone, visual and/or audio indication is provided of the aircraft's possible intersection with a TFR zone based on the current heading. Visual indication may be provided using GUI 200 and audio indication may be provided using aural indication system 224 as described above. For example, if the current heading is intersecting a TFR zone and the distance to violation is less than 5 miles, then the left turn arrow 214 or right turn arrow 216 (based on the location of the TFR zone relative to the aircraft) may be illuminated in yellow along with an aural indication such as "TFR zone to the left, turn right" or "TFR zone to the right, turn left". The directional arrows provide the fastest measure to avoid the TFR zone by changing the aircraft heading. As the aircraft nears the TFR zone and the current heading still intersects the TFR zone, the left turn arrow 214 or the right turn arrow 216 may be illuminated in red along with aural indications such as "TFR zone to the immediate left" or "TFR zone to the immediate right".

In step 316, if it is determined in step 312 that the aircraft's current heading does not intersect a TFR zone, it is determined whether there are any TFR zones in the vicinity of the aircraft based on the aircraft's current position and/or current heading. A TFR zone is in the vicinity of an aircraft if it is at a predetermined distance from the aircraft's current position and/or heading or if the TFR zone ceiling is at a predetermined distance from the aircraft's current altitude and if a predetermined deviation in the angle of the aircraft's current heading intersects a TFR zone.

In step 318, if it is determined in step 316 that there are TFR zones in the vicinity of the aircraft based on the aircraft's current heading, then visual and/or audio indication is provided of the aircraft's possible intersection with a TFR zone if the aircraft were to turn in a particular direction. Visual indication may be provided using GUI 200 and audio indication may be provided using aural indication system 224 as described above. For example, if the aircraft's current heading ±45° intersects a TFR zone and the distance to the TFR violation is less than 5 miles, then left watch bar 218 or right watch bar 220 (depending upon location of the TFR) may be illuminated in yellow to indicate that a turn in that direction will result in a TFR violation along with aural indication of the same. If the aircraft's current heading ±45° intersects a TFR zone and the distance to the TFR violation is less than 3 miles, then left watch bar 218 or right watch bar 220 (depending upon location of the TFR) may be illuminated in red to indicate that a turn in that direction will result in a TFR violation along with aural indication of the same. In another example, if the aircraft is above the TFR and the aircraft's altitude is 200 to 500 feet above the ceiling of the TFR, then the descent watch bar 222 is illuminated in yellow to indicate that a descent below a certain altitude will result in a TFR violation along with aural indication of the same. If the aircraft is above the TFR and the aircraft's altitude is 0 to 200 feet above the ceiling of the TFR, then the descent watch bar 222 is illuminated in red to indicate that a descent below a certain altitude will result in a TFR violation along with aural indication of the same.

If it is determined in step 316 that there are no TFR zones in the vicinity of an aircraft based on the aircraft's current heading, then control returns to step 304.

Figure 4:
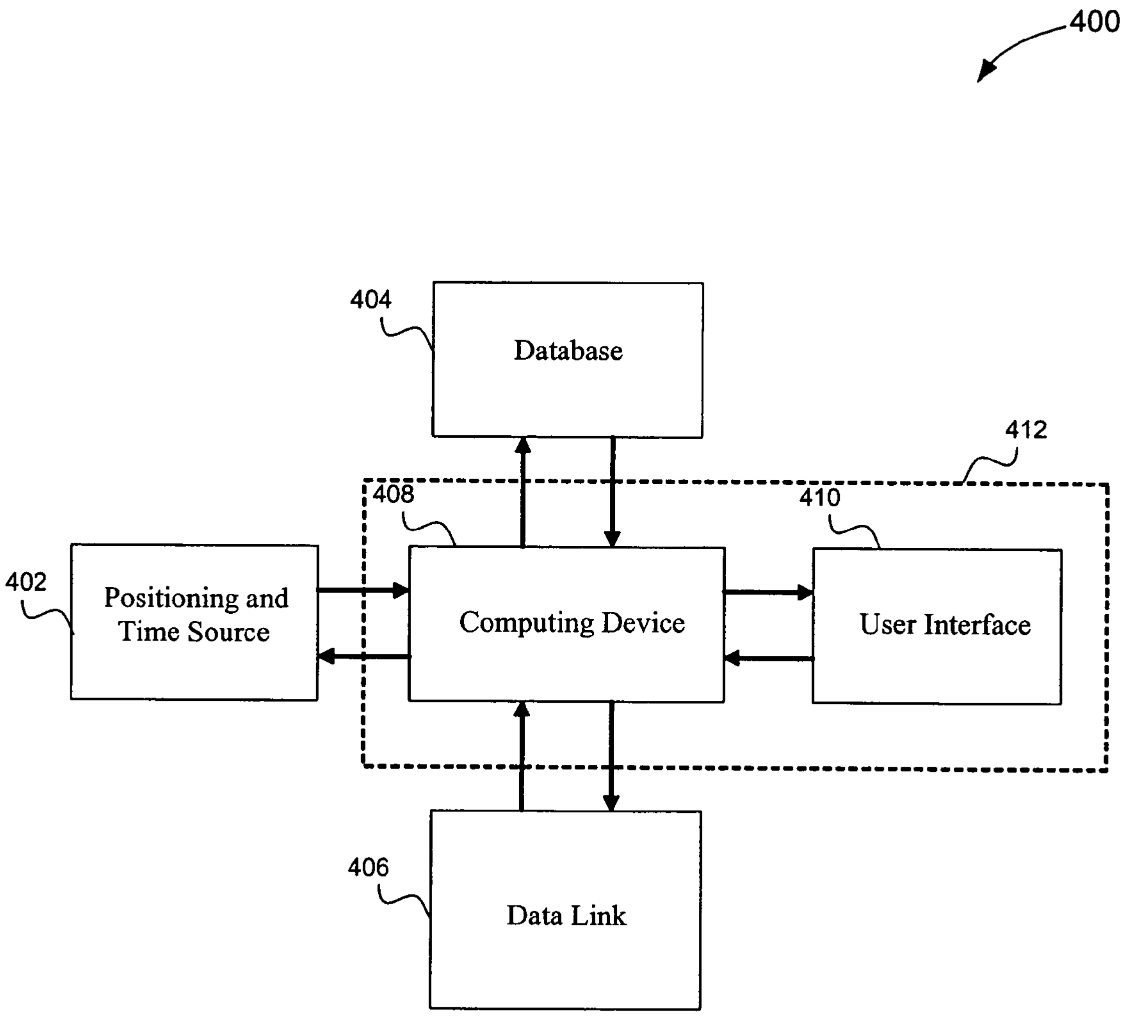
FIG. 4 illustrates a system to detect, avoid and/or exit a flight restriction zone according to an embodiment of the invention.

FIG. 4 illustrates a Airspace Alerting and Avoidance system 400 to indicate, detect, avoid and/or exit a flight restriction zone according to an embodiment of the invention. System 400 utilizes current aircraft position data and all active TFR zone information. The aircraft's position information and a reference system time is obtained from positioning and timing source 402 such as a GPS receiver which may be either a standalone unit connected to system 400 or embedded within system 400 itself. The aircraft positioning data is used to determine the aircraft's current position and compare the aircraft's current position to the database of TFR zones 404. The time reference is used to determine when TFR zones will become effective (e.g., whether a TFR is scheduled to be active during the flight time of the aircraft). In an embodiment, the positioning source 402 is a separate GPS receiver with a wireless radio frequency link with the handheld computing device 412.

In an embodiment, the signals provided to computing device 408 from a GPS receiver 402 are in standard National Marine Electronics Association (NMEA) message formats. NMEA has a message specification that defines the interface between components of marine electronic equipment and has become the default standard for aviation message formats as well. Although in an example system 400 uses the NMEA standard formats, positioning information may be provided in a wide range of other formats.

The TFR locations are stored aboard the aircraft in database 404, and may be updated, for example, by any one of (1) preflight updating via web-based application or from a website (2) preflight updating via data link 406 (3) in-flight update via manual entry of new or revised database elements, (4) in-flight updating via data link 406 when an application that runs on computing device 408 to detect TFR zones is started or initialized (5) when a flash memory card is inserted into database 404 or (6) when database 404 is synchronized with a device storing the latest TFR zone information. Database 404 of TFR zones includes a physical description of the TFR zone, type of TFR zone (e.g., prohibited TFR zone, restricted TFR zone, etc.), effective time and date of the TFR zone, and ending time and date of the TFR zone. Database 404 transfers TFR zone information to computing device 408, for example, (1) by means of a flash memory card that stores the latest TFR zone information or (2) by syncing with device 412 (e.g. syncing database 404 with a Personal Digital Assistant (PDA) 412).

Database 404 may provide database-related messages which may be viewed via user interface 410. These message include (1) date of last database update (e.g., "Last TFR Database update was DD/MM/YYYY at HH:MM:SS; please update database before every flight") and (2) unreadable or missing database (e.g., "Database is missing or unreadable; NO ALERTS CAN BE PROVIDED").

Database 404 may be formatted so as to allow an application to convert compatible database data, by an authorized source, to XML format. Database 404 may also be setup to allow a program developer to add/delete data elements and not allow a user to edit the database. Database 404 may be filtered, for example, (1) by time, such that inactive data elements are not considered until they are a variable number of minutes prior to activation, or have expired (2) for distance, such that only those database elements within reasonable flying time of the current aircraft destination are considered.

Data link 406 is enabled to obtain TFR updates for database 404 when system 400 is started or during flight. Data link 406 can be especially useful for providing updates such as an unexpected Presidential visit in the vicinity of the aircraft's flight path. Data link 406 might obtain updates from synchronization sources such as a ground tower (not shown) or satellites (not shown).

Computing device 408 is used to run applications, execute algorithms, process data and control system 400 functions to enable indication, detection, avoidance and/or exit of a flight restriction zone. Computing device 408 may be a processor with associated memory. Computing device 408 may be capable of executing an operating system application. Computing device 408 may be used to run steps of flowcharts 100 and 300.

User interface 410, which may be graphical (e.g., the display screen of a PDA) or non-graphical (e.g., combinations of text displays and display elements such as LEDs, colored incandescent bulbs, etc.) includes the ability to monitor and display status of system 400. An example of user interface 410 is GUI 200. User interface 410 may also include audio capabilities for example, speakers 224. Computing device 408 and user interface 410 may be part of a hand-held computing device 412, such as a PDA.

Figure 5A:
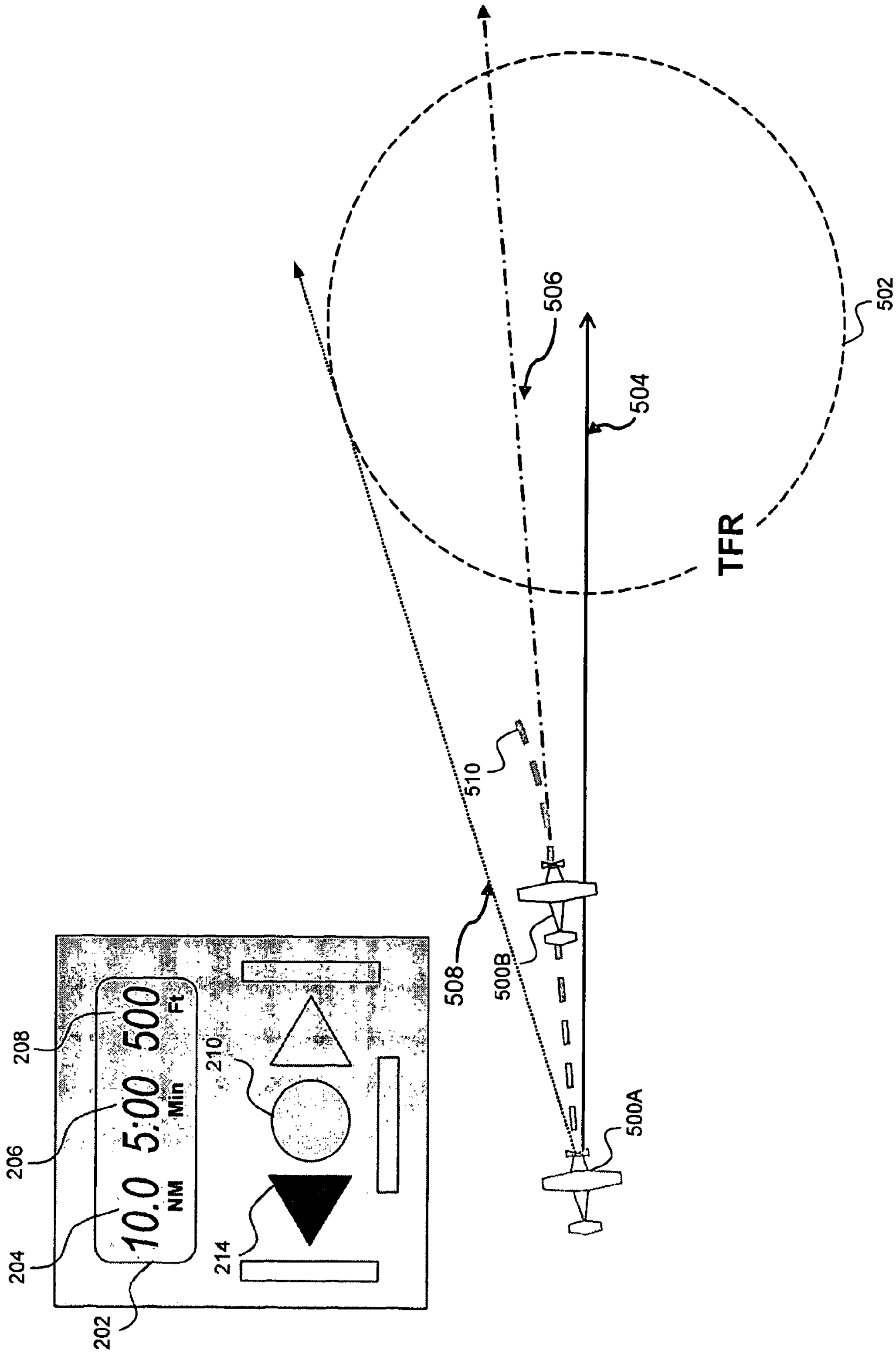
FIG. 5A illustrates an example of flight restricted zone detection and avoidance according to an embodiment of the invention.

FIG. 5A illustrates an example of TFR zone detection and a first step to avoiding the TFR zone according to an embodiment of the invention. FIG. 5A illustrates, a TFR zone 502 defined by a circle, an aircraft 500 and its first position 500A and second position 500B, a heading 504 to the center of the TFR zone 502 based on the aircraft's first position 500A, a current heading 506 of the aircraft 500 based on first position 500A, bearing 508 which clears TFR zone 502 and a corrected bearing 510.

As illustrated in FIG. 5A, the current heading 506 of aircraft 500 intersects with TFR zone 502. Upon detecting intersection of current heading 506 with TFR zone 502, a visual indication is provided by illuminating left arrow 214 of GUI 200, and indicating the distance 204 to the TFR zone 502 boundary, the time 206 to reach the TFR zone 502 boundary and the altitude 208 need to be gained to clear a ceiling of TFR zone 502 based on the current heading 506. Simultaneously status light 210 is illuminated in yellow to indicate that current heading 506 intersects with TFR zone 502. Illuminating left arrow 214 indicates that turning left will set aircraft 500 on corrected bearing 510 that clears TFR zone 502. Aural indications "Such as TFR ahead, turn left" may be provided by aural indication system 224. Based on the left turn arrow 214 and/or aural indications, a pilot or autopilot might correct the heading of aircraft 500 to heading 510.

Figure 5B:
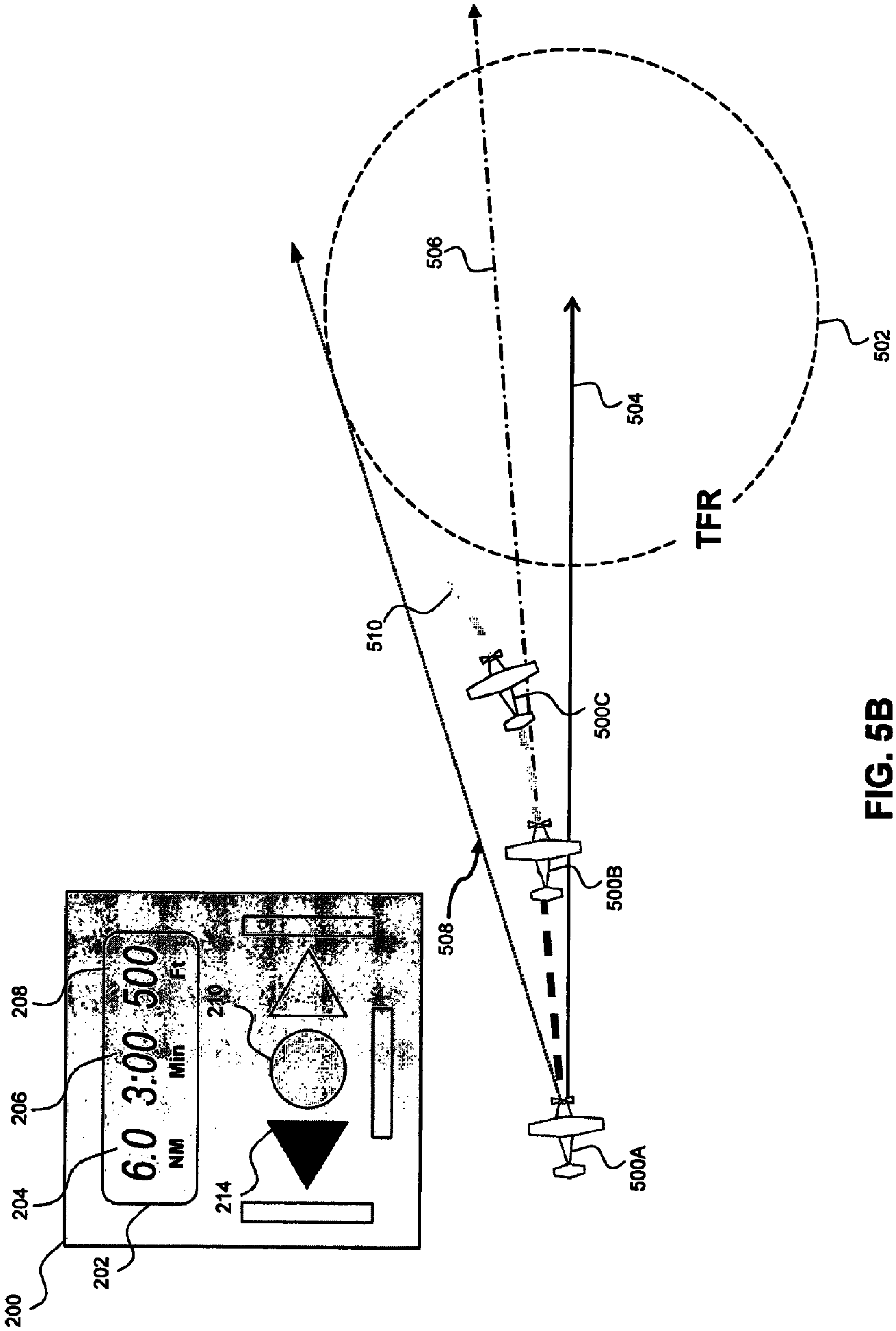
FIG. 5B illustrates another example of flight restricted zone detection and avoidance according to an embodiment of the invention.

FIG. 5B further illustrates the example of TFR zone detection and avoidance shown in FIG. 5A according to an embodiment of the invention. FIG. 5B illustrates TFR zone 502, aircraft 500 and its first position 500*a*, second position 500*b* and third position 500*c*, a heading 504 to the center of the TFR zone 502 based on the aircraft's first position 500*a*, original heading 506 of the aircraft 500 based on first position 500*a*, a bearing 508 which clears TFR zone 502, and a corrected bearing 510.

As illustrated in FIG. 5B, visual indication continues to be provided by illuminating left arrow 214 of GUI 200, and indicating the distance 204 to the TFR zone 502 boundary (6 NM), the time 206 to reach the TFR zone 502 boundary (3 minutes) and the altitude 208 needed to be gained to clear TFR zone 502 ceiling (500 feet) based on the current heading 510. As can be seen, distance 204 and time 206 to TFR zone 502 boundary has changed from that illustrated in FIG. 5A since time has elapsed between second position 500B and third position 500C. Status light 210 continues to be illuminated in yellow to indicate that aircraft 500 is yet to clear TFR zone 502. Illuminating left arrow 214 indicates that by continuing to turn left aircraft 500 will clear TFR zone 502. Aural indications "Approaching TFR, turn left" may also continue to be provided by aural indication system 224. Based on the left arrow 214 and/or aural indications, a pilot or autopilot might continue to correct the bearing of aircraft 500 to bearing 510. Aircraft 500 is now in position 500C on corrected bearing 510.

Figure 5C:
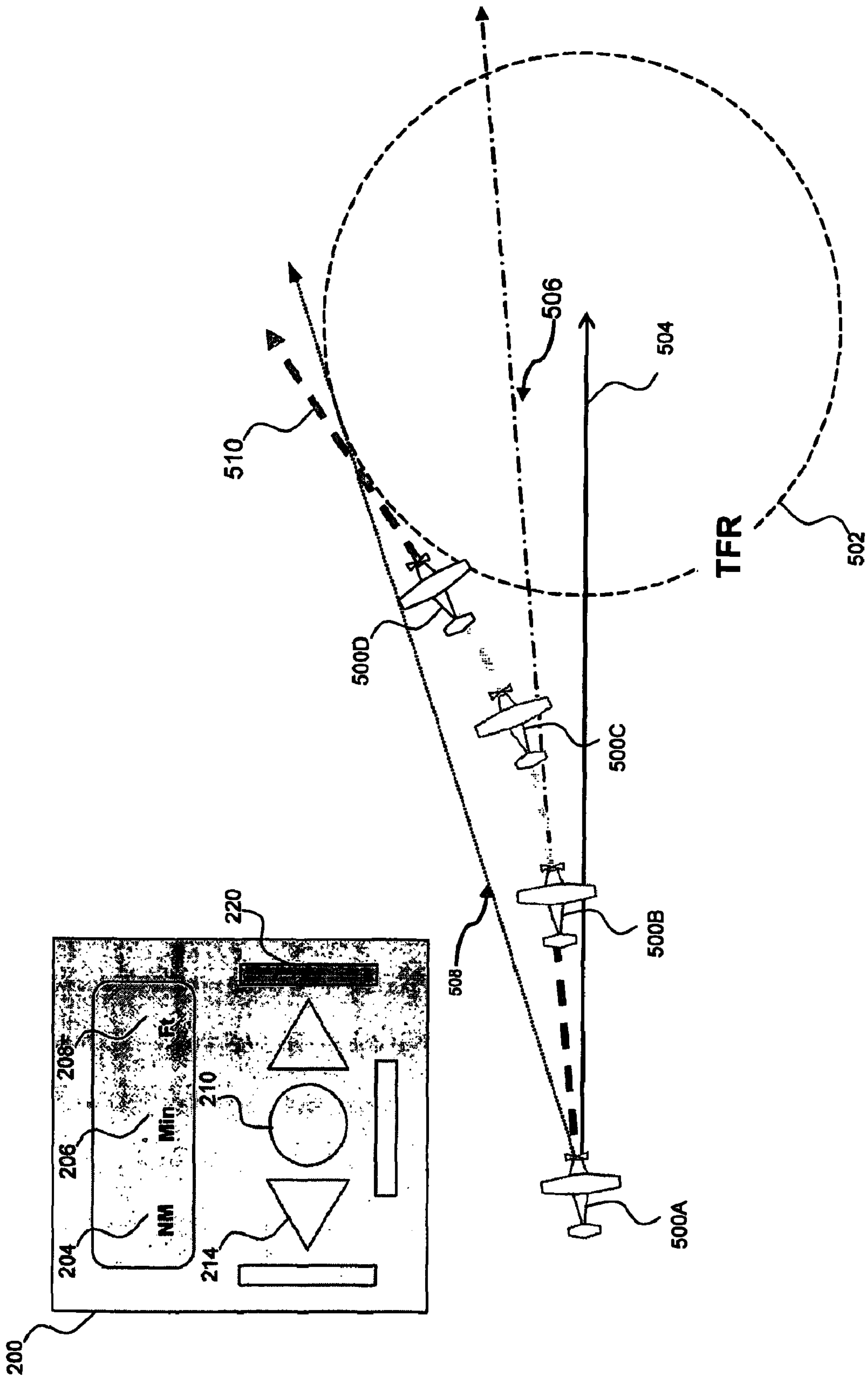
FIG. 5C illustrates yet another example of flight restricted zone detection and avoidance according to an embodiment of the invention.

FIG. 5C further illustrates the example of TFR zone detection and avoidance shown from FIG. 5B according to an embodiment of the invention.

FIG. 5C illustrates TFR zone 502, aircraft 500 and its first position 500A, second position 500B, third position 500C and fourth position 500D, a heading 504 to the center of the TFR zone 502 based on the aircraft's first position 500A, original heading 506 of the aircraft 500 based on first position 500A, a bearing 508 to clear TFR zone 502, and a corrected bearing 510.

Aircraft 500 is now in position 500D on corrected heading 510. Left arrow 214 in not illuminated since there is no need to turn further left based on corrected heading 510. Visual indication in GUI 200 changes to illuminate right watch bar 220 in red to indicate presence of TFR zone 502 in the immediate vicinity and to the right of aircraft position 500D (or within 5 miles and ±45° of corrected heading 510). Status light 210 is illuminated in green to indicate that TFR zone 502 will be cleared based on corrected heading 510. Distance 204, time 206 and altitude 502 are blank since TFR zone 502 has been cleared. Although TFR zone 502 is depicted as a two-dimensional circle in FIGS. 5A-5C, it is to be appreciated that TFR zone 502 can be any 3-dimensional geometric shape.

Figure 6:
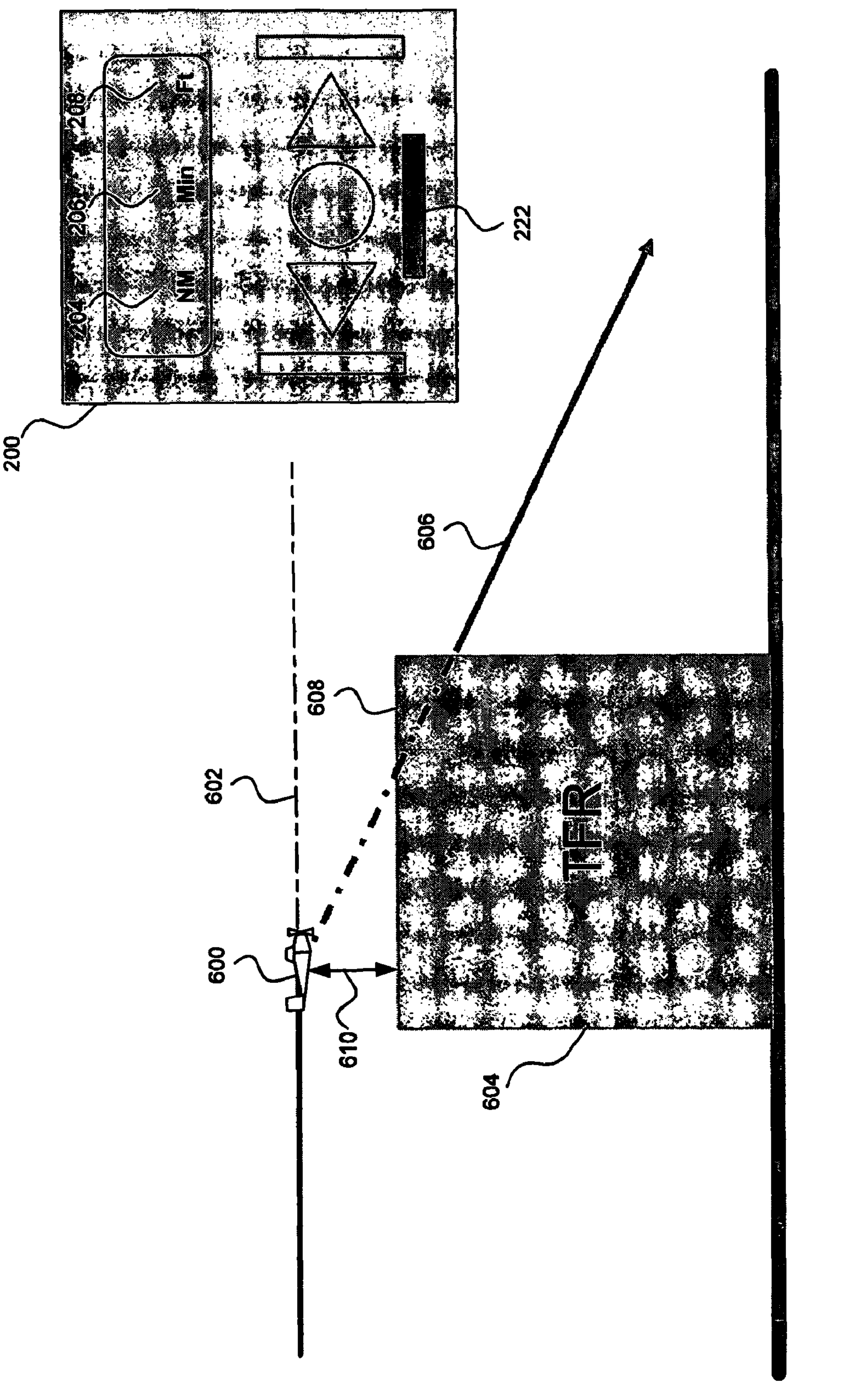
FIG. 6 illustrates an example of TFR zone ceiling detection and avoidance according to an embodiment of the invention.

FIG. 6 illustrates an example of TFR zone ceiling detection and avoidance according to an embodiment of the invention. FIG. 6 illustrates aircraft 600, a current heading 602 of aircraft 600, a TFR zone 604, a ceiling 608 of TFR zone 604, and a vertical distance 610 between aircraft 600 and ceiling 608.

On current heading 602, aircraft 600 will clear TFR zone 604 since there is sufficient vertical distance 610 between aircraft 600 and ceiling 608. Based on vertical distance 610, descent watch bar 222 is illuminated in a predetermined color to indicate presence of TFR ceiling 608 below aircraft 610. For example, if the vertical distance 610 is between 200 ft to 500 ft, then the descent watch bar 222 is illuminated in yellow to indicate that TFR ceiling 608 is below the aircraft and a descent below a certain altitude will result in a TFR violation along with aural indication of the same. If vertical distance 610 is 0 to 200 feet, then the descent watch bar 222 is illuminated in red to indicate that the TFR ceiling 608 is relatively close below aircraft 600 and a descent below a certain altitude will result in a TFR violation along with aural indication of the same. If aircraft 600 were to descend so as to change bearing from current heading 602 to heading 606, it would intersect TFR zone 604.

Although the examples presented herein are directed towards TFR zones, these can be applied to other areas of interests such as borders of countries, no-fly zones etc.

Example GPS Messages

There are a number of different NMEA GPS messages that are defined in the NMEA specification. In an embodiment, system 400 and flowcharts 100 and 300 require only two of the following standard message formats: the Global Positioning Fix Data (GGA) message and the GPS/Transit Data message or the Recommended Minimum (RMC) message. Under the NMEA-0183 standard, all characters of these messages are printable ASCII text (plus carriage return and line feed). NMEA-0183 data is typically sent at 4800 baud in configurable intervals from 0.8 seconds to 5 seconds. The GGA message provides the current fix information data which includes 3D location and accuracy data. The RMC message provides the essential GPS PVT (position, velocity, time) information computed by the GPS receiver. Examples of GGA and RMC messages and format information are provided below:

An example GGA message:

```
$GPGGA,123519,4807.038,N,01131.000,E, 1,08,0.9,
    545.4,M,46.9,M,,*47
```

The GGA fields are defined as follows: Time of fix (hhmmss), latitude, N/S, longitude, E/W, Quality (0=invalid, 1=GPS fix, 2=DGPS fix), number of satellites tracked, horizontal dilution of position, altitude, M (for meters), height of GEOID above WGS84 ellipsoid, seconds since last DGPS update, DGPS station ID, checksum.

An example RMC message:

```
$GPRMC,123519,A,4807.038,N,01131.000,E,022.4,
    084.4,230394,003.1,W*6A
```

The RMC fields are defined as follows: Time of fix (hhmmss), Status (A=OK, V=warning), latitude, N/S, longitude, E/W, ground speed (knots), course, date of fix (ddmmyy), magnetic variation, E/W, checksum.

Example TFR Information

In an embodiment, TFR locations are stored in database 404 in the following format:

```
<?xml version="1.0" standalone="yes"?>
<FR>
  <FRA>
    <id>1</id>
    <type>TFR</type>
    <desc>Tacoma WA</desc>
    <eff_start_date>05/20/2003</eff_start_date>
    <eff_end_date>05/20/2009</eff_end_date>
    <eff_start_time>10:00 AM</eff_start_time>
    <eff_end_time>11:00 AM</eff_end_time>
    <latitude>47.43701</latitude>
    <longitude>-122.3079533333</longitude>
    <radius>5</radius>
    <max_altitude>1000</max_altitude>
  </FRA>
  <FRA>
    <id>2</id>
    <type>TFR</type>
    <desc>P 40</desc>
    <eff_start_date>05/20/2003</eff_start_date>
    <eff_end_date>05/20/2009</eff_end_date>
    <eff_start_time>10:00 AM</eff_start_time>
    <eff_end_time>11:00 AM</eff_end_time>
    <latitude>39.645278</latitude>
    <longitude>-77.473611</longitude>
    <radius>5</radius>
    <max_altitude>5000</max_altitude>
  </FRA>
</FR>
```

The structure of the XML includes a Flight Restrictions (FR) root element that may have one or more TFR zones. The database schema allows a TFR to be defined by type given a description of the particular TFR.

Based on the current aircraft location information received via the GPS, TFR zone information may be filtered. These filters are based on the aircraft's proximity to the TFR and the TFR's effective start and end date and time. Once it is determined that a TFR is in effect and within proximity of the aircraft, the latitude, longitude, radius, and altitude values, along with the aircraft location data, are passed to the alerting algorithms to determine the alerts, as necessary.

Example Calculations

Below are example notations for data in database 404, GPS message fields and calculations that may be performed by computing device 408 for determining TFR violations, intersection with a TFR zone, distance to TFR violation, turn advisory to avoid a TFR zone, and escape course to exit a TFR zone.

| Circle Parameters | TFR Database Field | Units |
|---|---|---|
| R = circle radius | 11 | nMi |
| H = area ceiling | 12 | feet |
| $\phi_c$ = Circle Latitude | 7, 8 | degrees |
| $\Theta_c$ = Circle Longitude | 9, 10 | degrees |

| Aircraft Parameters | NMEA Message Field | Units |
|---|---|---|
| $\phi_{ac}$ = Aircraft Latitude | RMC 3, 4 | degrees |
| $\Theta_{ac}$ = Aircraft Longitude | RMC 5, 6 | degrees |
| s = speed | RMC 7 | knots |
| $\phi$ = true course | RMC 8 | degrees |
| $H_{ac}$ = aircraft altitude | GGA 8 + GGA 9 | feet |

Filter For Height $H_{ac}$−H>=Altitude buffer then NO PROBLEM

Determine Relative Position & Unit Bearing Vector $P=(k_{lat}\cos(K\,\phi_{ac})(\Theta_{ac}-\Theta_c),\ k_{lat}(\phi_c-\phi_{ac}))$ position relative to aircraft $u=(\sin(K\,\phi), \cos(K\,\phi))$ unit vector in the direction of motion of the aircraft, North along y axis Determine Violation State If $|P|-R<$Lateral Buffer VIOLATION is true otherwise VIOLATION is false Determine Conflict State (Projected Violation)

If $|u{*}P|-R<$Lateral Buffer and $u\cdot P>0$ then CONFLICT is true otherwise CONFLICT is false Distance to Violation Distance to Violation$=[u\cdot P]\pm[(u\cdot P)^2-(|P|^2-R^2)]^{1/2}$ Time To Violation=Distance to Violation/speed in knots

| Light Logic | |
|---|---|
| VIOLATION | then turn on the red light |
| CONFLICT | if Time To Violation <5 minutes then steady yellow |
| otherwise | steady green |

-continued

| Vector Math Used in Computations: | |
|---|---|
| $A + B = (A_x + A_y, B_x + B_y)$ | Vector sum |
| $A - B = (A_x - A_y, B_x - B_y)$ | Vector difference |
| $A \times B = (A_x B_y) - (A_y B_x)$ | Cross product Z component (we will only use the z component) |
| $A \cdot B = (A_x B_x) + (A_y B_y)\vert$ | Dot product |
| $\vert A\vert = [A_x^2 + A_y^2]^{1/2}$ | Vector Length |

It is to be appreciated that example ways of determining whether an aircraft is in a TFR zone, whether the aircraft's current heading intersects the TFR zone or whether the aircraft is in the vicinity of TFR zones are provided for purposes of illustration, and are not intended to be limiting. Further ways of determining TFR violation or possible TFR violations are also within the scope of the present invention. Such further ways of determining TFR violation or possible TFR violations may become apparent to persons skilled in the relevant art(s) from the teachings herein.

The present invention, or portions thereof, can be implemented in hardware, firmware, software, and/or combinations thereof.

Figure 7:
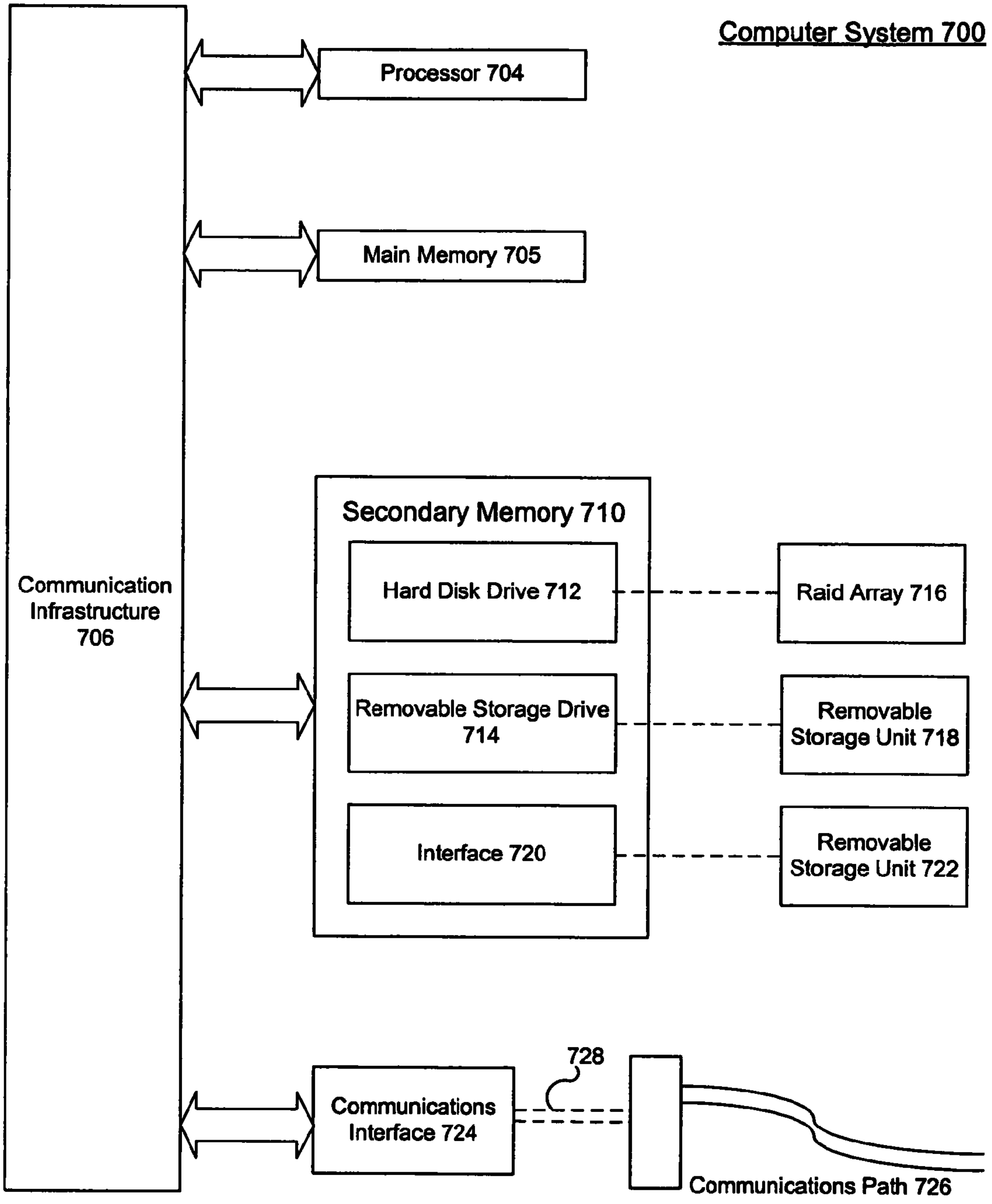
FIG. 7 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 700 is shown in FIG. 7. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

| Determine Turn Advisory for violation and conflict | | |
|---|---|---|
| If $\vert P\vert = 0$ | then advise_turn = none | in the center so on the way out |
| If$(u \cdot P)/\vert P\vert < -0.94$ | then advise_turn = none | on the way out $0.94 \approx \cos(20°)$ |
| If $(u \cdot P)/\vert P\vert > \cos(K\ \mathrm{brgStability})$ | then advise_turn = left | to within brgStability of center |
| If $u \times P > 0$ | then advise_turn = right | |
| If $u \times P <= 0$ | then advise_turn = left | |

Assumptions: Prefer left turns, heading stability within user selectable brgStability °.

| User Selectable Parameters | |
|---|---|
| Altitude buffer = 500 ft | Later 500, 700, 900 |
| Lateral Buffer = 0.5 nmi | Later 0.5, 1.0, 1.5 |
| brgStability = 2 degrees | |

| Fixed Parameters | |
|---|---|
| $k_{lat}$ = 60 | Nautical Miles Per Latitude Degree |
| K = 0.0174533 | radians/degree |

| Vector Math Used in Computations: | |
|---|---|
| $A = (A_x, A_y)$ | given A is a vector |
| $B = (B_x, B_y)$ | given B is a vector |

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 705 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention. Where the invention is implemented using software, the software may be stored in a computer program product and loaded into computer system 700 using raid array 716, removable storage drive 714, hard drive 712 or communications interface 724.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to indicate an actual or potential Temporary Flight Restriction (TFR) zone violation and indicate measures to avoid or exit a TFR zone, comprising:

receiving TFR zone information and an aircraft's position information, ground track and ground speed;

processing the aircraft's position information, ground track and ground speed to determine the aircraft's current heading;

determining whether there is a TFR zone violation based on the aircraft's current position, whether the aircraft's current heading results in a potential TFR violation based on the aircraft's current position and heading and whether the aircraft is in the vicinity of a TFR zone based on the aircraft's current position and heading;

providing indicators of a TFR zone violation, potential TFR zone violation when the aircraft is at a predetermined distance from the TFR zone or if the aircraft will intersect the TFR zone in a predetermined amount of time, no TFR zone violation or absence of a TFR zone in the vicinity; and if a TFR zone violation, or possible TFR zone violation or presence of a TFR zone in the vicinity are determined, providing indicators of measures to exit the TFR zone or change the aircraft's current heading to avoid the TFR zone.

2. The method of claim 1, wherein a TFR zone violation occurs when an aircraft is in a TFR zone based on the aircraft's current position and a possible TFR zone violation occurs based on whether an aircraft's current heading intersects a TFR zone.

3. The method of claim 1, wherein an aircraft is in the vicinity of a TFR zone when the TFR zone is at one or more of a predetermined distance, predetermined angle from the aircraft's current heading or the ceiling of the TFR zone is at predetermined altitude below the aircraft.

4. The method of claim 1, wherein said TFR zone information is a function of one or more of TFR zone start date, TFR zone start time, latitude, longitude, radius and altitude of a TFR zone.

5. The method of claim 1, wherein aircraft position information is a function of one or more of latitude, longitude, altitude, ground speed, course, magnetic variation and date of fix.

6. The method of claim 1, further comprising:

receiving a reference system time to determine whether a TFR zone is active;

wherein said providing indicators step that provides said indicators only when said TFR zone is active.

7. The method of claim 1, wherein the indicators are one or more of audio and visual indicators.

8. A system to detect and indicate a TFR zone violation, potential TFR zone violation or a TFR zone in vicinity of an aircraft and indicate measures to avoid or exit a TFR zone comprising:

a user interface configured to provide indicators; and a computing device;

wherein the computing device is configured to receive downloaded or stored TFR zone information, aircraft position information, ground track and ground speed, and determine the aircraft's current heading based on the aircraft's position information, ground track and ground speed, determine whether the aircraft violates a TFR zone based on the received aircraft position information and TFR zone information, determine a potential TFR zone violation based on the aircraft's current heading and TFR zone information, indicate actual TFR zone violation or potential TFR zone violation when the aircraft is at a predetermined distance from the TFR zone or if the aircraft will intersect with the TFR zone in a predetermined amount of time, indicate a TFR zone in an aircraft's vicinity and indicate measures to exit a TFR zone or avoid a TFR zone violation.

9. The system of claim 8, wherein a TFR zone violation occurs when an aircraft is in a TFR zone based on the aircraft's current position and a possible TFR zone violation occurs based on whether an aircraft's current heading intersects a TFR zone.

10. The system of claim 8, wherein a TFR zone is in an aircraft's vicinity when the TFR zone is at one or more of a predetermined distance, predetermined angle from the aircraft's current heading or the ceiling of the TFR zone is at predetermined altitude below the aircraft.

11. The system of claim 8, wherein said TFR zone information is a function of TFR zone start date, TFR zone start time, latitude, longitude, radius and altitude of a TFR zone.

12. The system of claim 8, wherein aircraft position information is a function of latitude, longitude, altitude, ground speed, course, magnetic variation and date of fix.

13. A method to indicate a current or potential Temporary Flight Restriction (TFR) zone violation and indicate measures to avoid or exit a TFR zone, comprising:

receiving TFR zone information;

receiving aircraft position, ground track and ground speed information;

processing aircraft position, ground track and ground speed information to determine the aircraft's current heading;

determining whether the aircraft's current heading is intersecting a TFR zone;

determining whether a TFR zone is in the vicinity of the aircraft;

determining whether the aircraft is in a TFR zone;

providing indication of presence one or more TFR zones in the vicinity of the aircraft or presence of the aircraft inside a TFR zone or possible intersection of the aircraft with a TFR zone when the aircraft is at a predetermined distance from the TFR zone or if the aircraft will intersect the TFR zone in a predetermined amount of time;

indicating measures to exit a TFR zone if the aircraft is currently in a TFR zone;

indicating measures to avoid a TFR zone if the aircraft's current heading intersects a TFR zone; and indicating presence and location of a TFR zone if the TFR zone is in the vicinity of the aircraft.

14. The method of claim 13, wherein said TFR zone information is a function of TFR zone start date, TFR zone start time, latitude, longitude, radius and altitude of a TFR zone.

15. The method of claim 13, wherein aircraft position information is a function of latitude, longitude, altitude, ground speed, course, magnetic variation and date of fix.

16. The method of claim 13, wherein an aircraft is in the vicinity of a TFR zone based at least in part on one or more of a predetermined distance from the aircraft's current heading to the TFR zone, a predetermined distance between the aircraft and the TFR zone ceiling below the aircraft and if a predetermined deviation in the angle of the aircraft's current heading intersects the TFR zone.

17. The method of claim 13, wherein the measures to avoid the TFR zone include at least one of visual indication of a turn direction to avoid the TFR zone and aural indication of a turn direction to avoid the TFR zone.

18. The method of claim 13, wherein the measures to exit a TFR zone include at least one of visual indication of a turn direction to exit the TFR and aural indication of a turn direction to exit the TFR zone.

19. The method of claim 13, wherein the indicating steps involve use of at least one of audio and visual means.

20. The method of claim 13, further comprising receiving a reference system time to determine whether a TFR zone is active.

21. The method of claim 1, further comprising providing indication of a TFR zone in the vicinity of the aircraft if a predetermined deviation in an angle of the aircraft's current heading results in an intersection with the TFR zone.

22. The method of claim 1, further comprising providing indication of a TFR zone in the vicinity of the aircraft if the TFR zone is at a predetermined distance from the aircraft's current heading.

23. The method of claim 1, further comprising providing an alert if the aircraft is at a predetermined distance from a TFR zone but the aircraft's current heading does not intersect the TFR zone.

24. The method of claim 1, wherein the receiving TFR zone information step comprises receiving TFR zone information from one of (1) a preflight update via a web-based application or from a website, (2) an in-flight update via manual entry, (3) an in-flight update via a data link when an application to detect TFR zones is started or initialized, (4) a flash memory card, and (5) a database that is synchronized with a device storing TFR zone information.

25. The method of claim 1, the providing indicators step comprising illuminating a watch bar in red and providing an aural indication to indicate presence of a TFR zone in an immediate vicinity of the aircraft, wherein an aircraft is in immediate vicinity of a TFR zone if it is within 5 miles and $+-45°$ of the aircraft's current heading.

26. The method of claim 1, the providing indicators step comprising illuminating a watch bar in yellow and providing aural indication to indicate that a turn in a particular direction will result in a TFR zone intersection.

27. The method of claim 1, the providing indicators step comprising suppressing distance and time to fly to the boundary of a TFR zone if the aircraft is inside the TFR zone so as to indicate that separation with the TFR zone has been lost.

28. The method of claim 1, the providing indicators step comprising:

automatically activating a text display when a status light indicates potential or actual intersection of the aircraft's current heading with a TFR zone; and indicating via the text display a distance and a time to fly from the aircraft's current location to a boundary of a TFR zone based on current ground track and ground speed.

29. The method of claim 1, the providing indicators step comprising: displaying a gain in altitude required to clear a ceiling of a TFR zone.

30. The method of claim 1, the providing indicators step comprising:

providing an aural indication system that generates aural cues for avoiding a TFR zone.

31. The method of claim 30, further comprising:

annunciating a TFR zone boundary warning if an aircraft is at a predetermined distance from the TFR zone or if the aircraft will intersect the TFR zone in a predetermined amount of time.

32. The method of claim 1, further comprising:

providing indicators for each of: a TFR zone violation, potential TFR zone violation when the aircraft is within a predetermined distance from the TFR zone or if the aircraft will intersect the TFR zone within a predetermined amount of time, no TFR zone violation or absence of a TFR zone in the vicinity.

33. The system of claim 8, wherein the computing device is configured to indicate actual TFR zone violation or potential TFR zone violation when the aircraft is within a predetermined distance from the TFR zone or if the aircraft will intersect with the TFR zone within a predetermined amount of time.

34. The method of claim 13, further comprising:

providing indication of presence one or more TFR zones in the vicinity of the aircraft or presence of the aircraft inside a TFR zone or possible intersection of the aircraft with a TFR zone when the aircraft is within a predetermined distance from the TFR zone or if the aircraft will intersect the TFR zone within a predetermined amount of time.

* * * * *